July 10, 1951 R. POLK, SR., ET AL 2,560,128
APPARATUS FOR SECTIONIZING CITRUS FRUITS
Filed Dec. 16, 1948 3 Sheets-Sheet 1
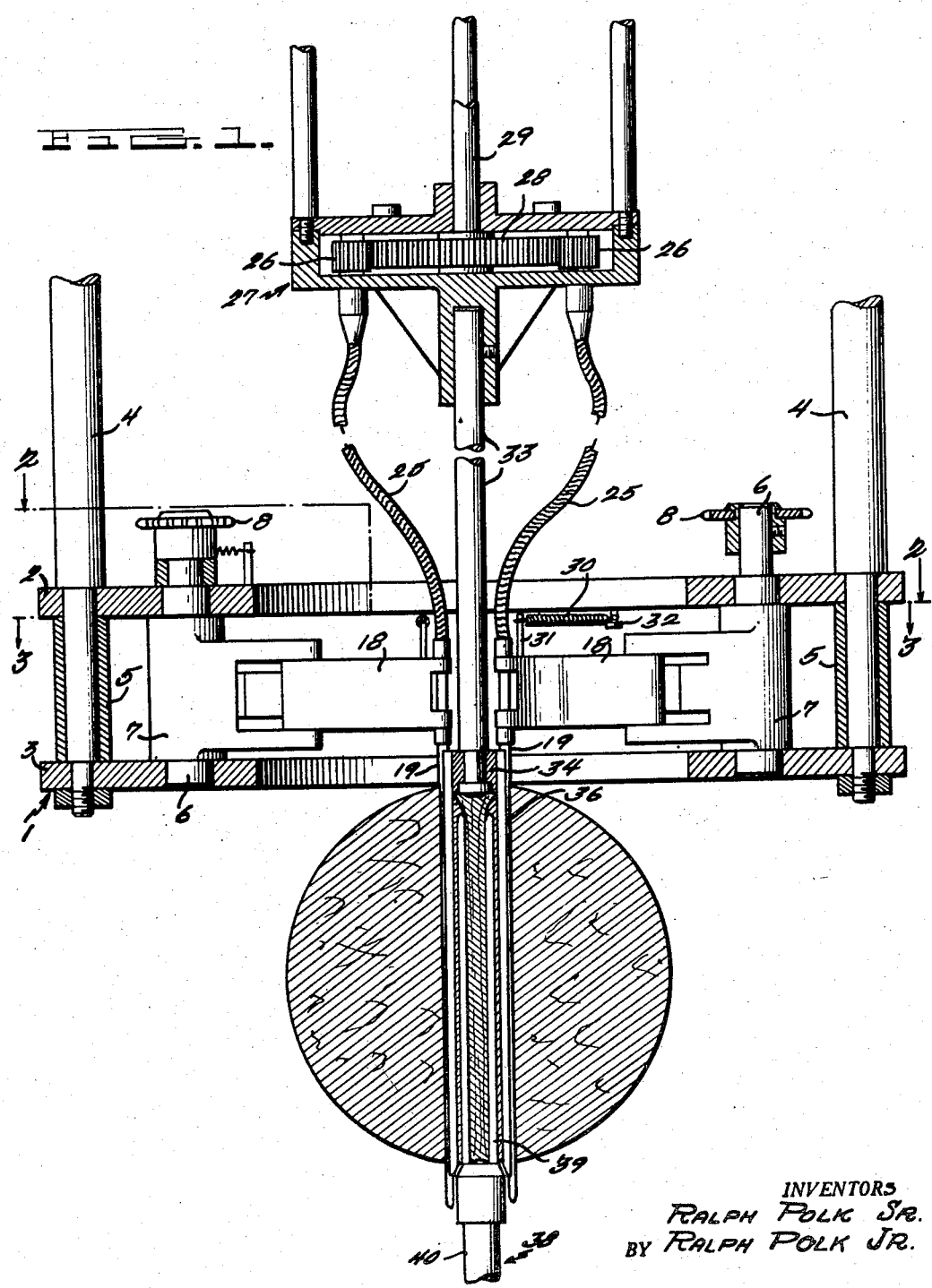
INVENTORS
RALPH POLK SR.
BY RALPH POLK JR.

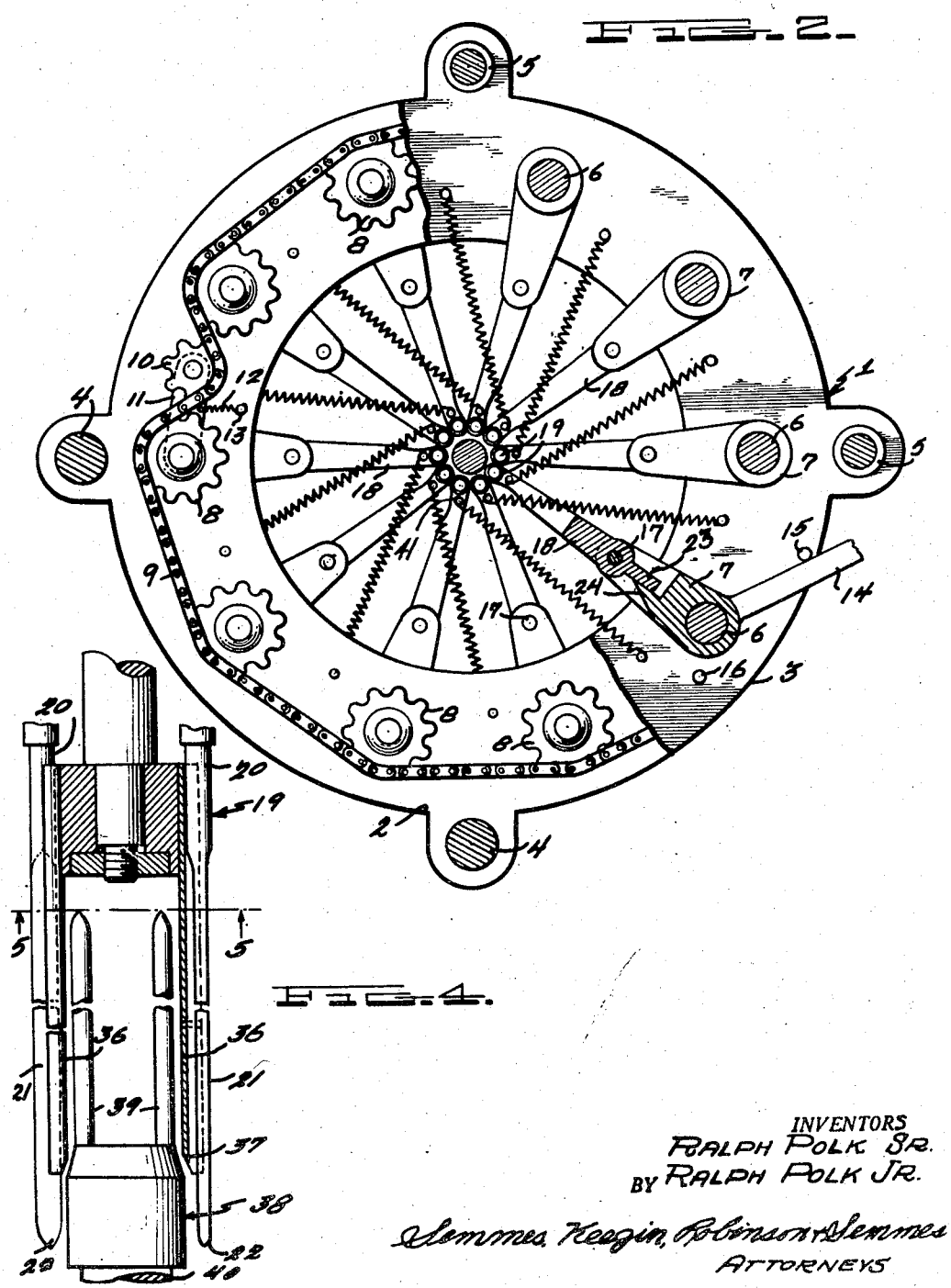

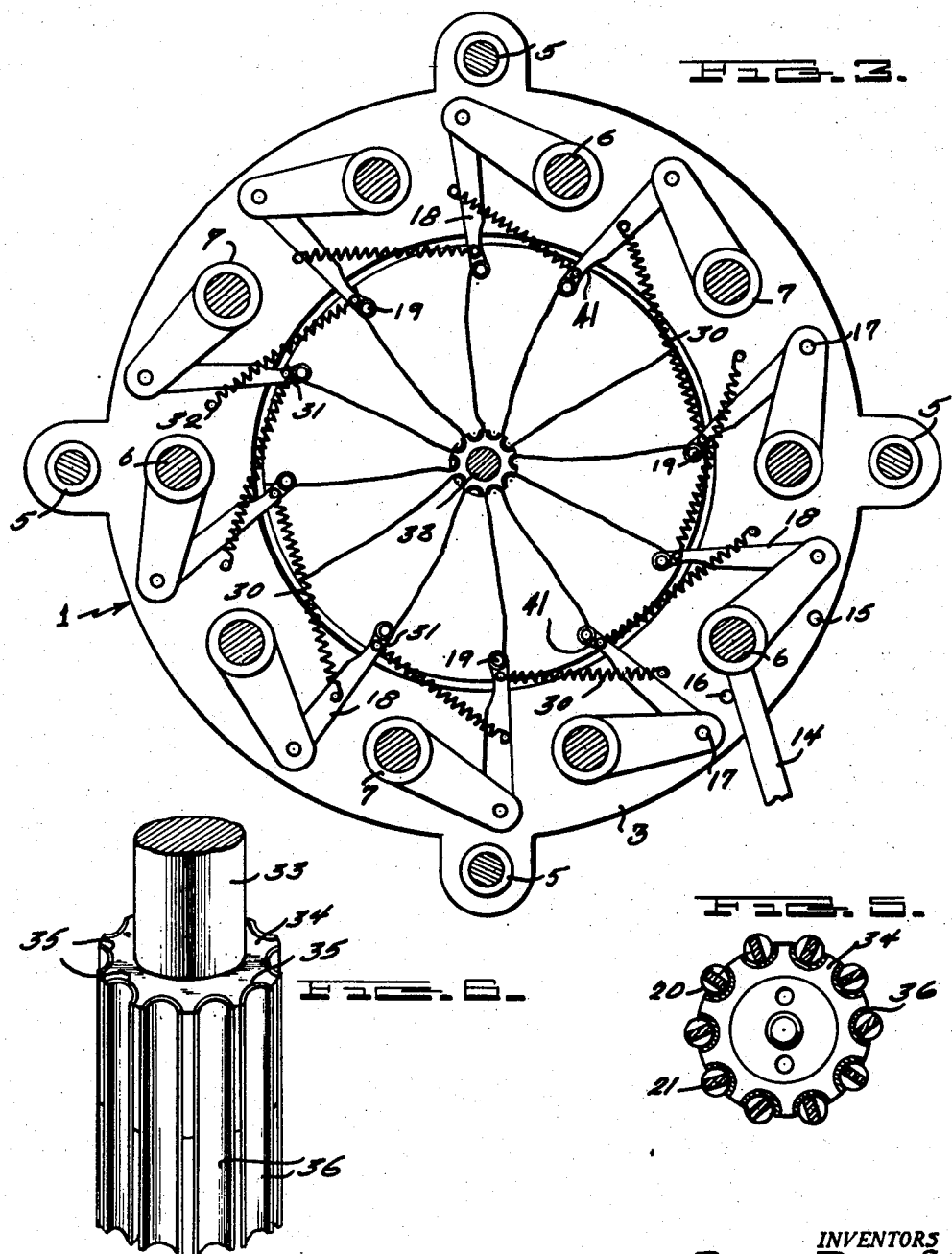

Patented July 10, 1951

2,560,128

UNITED STATES PATENT OFFICE 2,560,128

APPARATUS FOR SECTIONIZING CITRUS FRUIT

Ralph Polk, Sr., and Ralph Polk, Jr., Tampa, Fla., assignors to Polk Development Company, Tampa, Fla., a co-partnership Application December 16, 1948, Serial No. 65,578

5 Claims. (Cl. 146—3)

This invention relates generally to sectionizing of citrus fruit, such as grapefruit and oranges, and more particularly to a method and apparatus for parting the bond between the juice sac groups comprising the meats of the fruit sections and the radial membrane walls thereof to aid in the removal of the segmental meats from the membrane of the fruit. The present application is a continuation-in-part of our copending application Serial No. 43,627 filed August 11, 1948, now Patent No. 2,489,195, entitled Method and Apparatus for Sectionizing Citrus Fruit.

By way of preliminary explanation, the meat or juice bearing pulp of citrus fruit is composed of masses of interconnected juice sacs in the form of segmental sections, each section being surrounded by a membrane commonly known as the section wall. The sections surround a pithy core and vary in number between nine and fifteen in the average fruit and usually are of unequal size and shape.

Sectionizing is the removal of the membrane-free, segmental sections from the citrus fruit and is generally performed by first peeling off the outer skin and albedo, next subjecting the peeled fruit to a hot lye treatment to remove the outer or circumferential membrane from the sections, and then stripping the segmental juice sac groups from their radial membrane. This last operation is usually carried out by first slitting along the radial membrane wall.

As stated above, the number, size, and shape of the fruit sacs varies widely and, in addition, the radial membrane walls very seldom extend in true radial directions or in flat planes. These and other variable characteristics of the fruit make mechanical sectionizing where operating tools, such as slitting knives, are arranged in definite positions and movable along definite lines extremely difficult to perform to obtain well-formed, completely membrane-free sections in their natural size and without substantial juice loss.

The individual juice sacs comprising the fruit sections are joined together and to the section walls by natural bonds which experience shows may be parted with relative ease and, under suitable operating conditions, without substantial destruction of the juice sacs. Moreover, it has been noted that the juice sacs themselves are relatively yieldable, that is, they may be subjected to considerable pressure without bursting and will return substantially to their natural shape when the pressure is relieved. The membrane, while highly flexible, is relatively tough and will withstand considerable strain without rupture or tearing.

The aforesaid application discloses an apparatus for cleanly parting the bond between the juice sacs and the adjoined membrane walls of the fruit sections with substantially no destruction of the juice sacs. This apparatus comprises essentially a series of parallel rotating rods of small and preferably flattened cross section corresponding in number approximately to the average number of sections in a fruit. The rods are flexibly supported for independent movement from an initial position in a circular series for penetration polarwise in the apex regions in the fruit sections outwardly along the bond between the juice sacs and the adjacent membrane walls.

The free or entering ends of the rods are somewhat pointed and this, together with the flattened cross section, makes them in effect drills which bore their way through the fruit sections in the initial circular series position without substantial resistance to penetration, thereby permitting the simultaneous insertion of a substantial number of rods without compression or mutilation of the fruit. In their movement outwardly along the bonds between the juice sacs and the membrane, the rotary rods also reduce resistance to movement and in fruit of average to young maturity, the parting of the bond may be made with insufficient tension on the membrane to prevent it or the section being pulled loose from the adjoining section or core of the fruit. In older fruit, however, the core of the fruit is naturally weakened, and a tendency to pull some sections away from the core has been found.

An object of this invention, therefore, is to provide a stationary restraining element for each of the rotary bond parting rods positioned in the crotch or apex of the radial membranes of a section to restrain outward movement of the section under influence of the outwardly moving parting rod.

Another object of the invention is to provide in combination with the series of rotary bond parting rods in an apparatus of the above described character a corresponding series of stationary tines inserted in the fruit adjacent and parallel with each of the rotary rods to engage the membranes of the fruit sections and resist radial outward movement of the membrane structure during the bond parting operation.

Another object of the invention is to provide a series of stationary holding tines of the above character which lie closely adjacent the rotary rods, the boring rods boring a void through the fruit sections for insertion of the holding tines.

Another object of the invention is to provide stationary holding tines of the above character having a generally C-shaped or semi-cylindrical cross section in which nest respectively each of the rotary rods in their initial fruit penetrating positions.

With the above and other important objects and advantages in view the invention consists in the parts and combinations thereof hereinafter set forth with the understanding that various changes may be made therein by those skilled in the art such as in the size, shape, and arrangement of parts or by the substitution of equivalents without departing from the spirit of the invention or exceeding the scope of the appended claims.

In order to make the invention more clearly understood a preferred embodiment thereof has been made the subject of the illustrations in the accompanying drawings in which:

Figure 1 is a vertical transverse sectional view, parts being shown in elevation and parts being broken away, and an apparatus for parting the bond between the juice sacs and adjoined membrane wall of citrus fruit sections while restraining movement of the radial membrane structure in accordance with the invention;

Figure 2 is a cross sectional view taken along the line 2—2 of Figure 1 looking in the direction of the arrows;

Figure 3 is a cross sectional view taken along the line 3—3 of Figure 1 looking in the direction of the arrows;

Figure 4 is an enlarged transverse sectional view, partly broken away, of the stationary holding tine unit showing fragments of associated bond parting rods in their initial position and the relationship thereof with a primary fruit supporting fork;

Figure 5 is a cross sectional view taken along the line 5—5 of Figure 4 looking in the direction of the arrows; and Figure 6 is a detailed perspective view of the stationary holding tine unit with the lower ends of the tines broken away.

The apparatus shown in the drawings and to be described in the following may comprise a part or one station of a citrus fruit sectionizing machine in which whole peeled fruit prepared for sectionizing as above set forth is operated upon to remove its membrane free sections. As shown best in Figures 1, 2, and 3, the apparatus comprises a supporting head 1 constructed of a pair of axially aligned horizontal annular plates 2 and 3 held in vertical spaced relation by a series of posts 4 and spacing collars 5 which are positioned between the plates and respectively about the posts. The posts 4 may also serve as an attachment or support for the head 1.

Pivotally journalled in the plates 2 and 3 is a circular series of shafts 6 equally spaced circumferentially and extending between the plates. Each shaft 6 has rigidly secured thereto, between the plates, one end of an arm 7 which is movable with the shaft about the axis thereof. The upper end of each of the shafts 6 extends slightly above the upper plate 2 and has secured thereto a sprocket 8. An endless chain 9 passes around all the sprockets 8 and is provided with a tightening arrangement which may comprise an idler sprocket 10 carried by the free end of an arm 11, the opposite end of which may be pivotally carried by one of the shafts 6. A tensioning spring 12 extends between the arm 11 and an anchor 13 on the plate 2 to urge the sprocket 10 in a direction toward the center of the series of sprockets and yieldingly shorten the effective length of the chain.

One of the arms 7 is provided with an operating lever 14 which extends outwardly beyond the periphery of the head 1 and by means of which angular movement may be imparted to the arm and, through the sprocket and chain connections described, impart an equal angular movement to each of the other arms 7. A fixed stop lug 15 is engageable with the lever 14 in one direction of movement thereof and serves to limit the movement of the several arms 7 to inward positions wherein they all extend radially toward the center of the head 1 as shown in Figure 2. A second fixed stop lug 16 may engage the lever 14 in the opposite direction of movement thereof to limit outward angular displacement of the arms 7 as seen in Figure 3.

The free end of each of the arms 7 is bifurcated and carries a pin 17 parallel with the shaft 6 and on which is pivotally mounted one end of a second arm 18. In the free or outer end of each of the arms 18, there is rotatably journalled the shank portion of a rotary, bond parting rod 19. The rods 19 lie parallel with the axes of the shafts 6 and pins 7 and have their fruit engaging portions 21 extending downwardly below the head 1 as seen in Figure 1. The lower or free end of each rod is formed into a somewhat blunt point 22.

The rods 19 are of relatively small cross sectional dimensions and comprise a round shank portion 20 and a fruit engaging portion 21. The fruit engaging portion 21 is preferably of a non-round cross section, such as the rectangular shape seen in Figures 4 and 5. It will be understood, however, that other cross sectional configurations, such as triangular, square, lozenge-shaped, knurled, or fluted sections fall within the scope of this invention.

The arms 18 are free to swing about the axes of their pins 17 and jackknife with respect to their corresponding arms 7, but their movement in one direction is limited to a substantially straight line extension of a connected arm 7 by means of a lug 23, integral with the arm 18, and engageable with an abutment 24 formed on the arm 7 within the bifurcation as clearly shown in Figures 1 and 2.

By means of the above arrangement, the rotary rods may be moved outwardly from the center of the head by a positive force but, because of the flexible supports afforded by the hinged arms 7 and 18, a certain individual freedom of lateral movement is provided which is not controlled by the operating mechanism.

The shank 20 or upper end of each of the rods 19 has secured thereto by suitable means one end of a flexible driving shaft designated generally as 25 and which extends generally upwardly above the head 1 and carries on its upper end a pinion 26. The pinions 26 comprise a part of a conventional, multiple driving head 27 and mesh with a common driving gear 28 carried on a shaft 29 which is adapted for connection with a source of driving power (not shown). By means of the above, all of the rods 19 may be rotated in the same direction and at the same speed.

As will be brought out more fully in the description of the operation of the apparatus, it is advantageous to urge the rod, at least at the beginning of the bond parting operation, over into engagement with one of the section walls. To this end, each of the arms 18 is provided with a comparatively light, helical tensioning spring 30 which extends between a post 31 on the upper edge of the arm 18 and an anchor post 32 extending downwardly from the lower face of the head plate 2. Considering the rods 19 rotating in a clockwise direction, the posts 32 are positioned, and the lugs 23 and their cooperating abutments 24 are arranged so that the springs 30 will tend to urge the arms 18 and 7 in a clockwise direction about the axis of the shafts 6. This movement however, is controlled by the operating lever 14 as will be further described.

While it is important to urge the rods 19 into engagement with a section wall at the start of the bond parting operation, it is also advantageous that this force decrease as the rod progresses outwardly from the core of the fruit to reduce the tendency to rotate the fruit about its axis. The lengths of the springs 30 and their points of securement to the arms 18 and to the plate 2 are arranged, therefore, so that the springs 30 exert their maximum tensioning force when the rods 19 are in their initial position at the center of the head 1 and gradually lose their tensioning force as the rods move outwardly from the center. Under most conditions, the springs 30 may assume a rest condition exerting no tensioning force when the rods have been moved between one-fourth and one-half way outward from their initial position.

Secured to a stationary over-head part of the apparatus, such as the casing of the driving head 27, is a depending support rod 33 coaxially aligned with the plates 2 and 3 and extending therethrough. The lower end of the rod 33 terminates in an enlarged head 34 having a peripheral series of equally spaced longitudinal half-round flutes 35 formed therein and corresponding in number to that of the series of rods 14. As seen in Figure 1 the head 34 occupies a stationary position just below the arms 18 and its diameter is such that the flutes 35 are respectively substantially coaxial with the rods 19 when they are in their normal inner or initial position at the center of the supporting head 1.

Silver soldered or otherwise secured in each of the flutes 35 is the upper end of a holding tine member 36. These tine members are generally C-shaped or semi-cylindrical in cross section and depend downwardly from the head 34 in a circular parallel series and each tine member is adapted to nest one of the rods 19 in the initial position thereof as best seen in Figures 1 and 5. As seen in Figure 1 the tine members 36 are somewhat shorter than the rods 19 so that in nested position the free ends of the rods extend slightly below the ends of the tines. If desired, the lower extremities of the tines 36 may be beveled as indicated at 37 in Figure 4.

In operation, a fruit which has been peeled and lye-treated as described above, is impaled polarwise on a non-rotatable holding fork 38 which may comprise a circular series of several parallel tines 39 extending upwardly from a supporting rod 40 and which penetrates a corresponding number of the fruit sections closely about the core. With the rods 19 rotating and in their initial central position as shown in Figures 1 and 2, the holding fork and fruit are now positioned under and in axial alignment with the series of rods. The holding fork and fruit are now moved axially relative to the series of rotating rods which drill their way downwardly through the fruit sections which they contact. It will be noted that the blunt points of the rods inhibit penetration of a section wall but cause the rod to penetrate on one side or the other of the wall. It may be pointed out here also that the diameter of a series of rods 19 in their initial position is such as to engage the fruit sections as closely as practical to the apices of the sections in an average fruit, that is, a fruit of average size and with an average core diameter. As rods 19 bore their way through the fruit sections, these sections are also impaled on the tines 36 which follow the rods in the holes or small voids drilled by the rods 19 as shown in Figure 1.

After the holding fork and fruit have moved to their upper limit where the rods 19 and tines 36 have penetrated completely through the fruit as illustrated in Figure 1, the operating lever 14 is actuated to move all the arms 7 angularly in a clockwise direction about the axes of their respective shafts which moves the rods 19 outwardly from their nested positions in the tines 36. Due to the fact that the springs 30 are exerting their force in the same direction, the end of each of the arms 18 and the rod 19 carried thereby will also tend to move about the axis of the corresponding shaft 6. The springs 30, therefore, each exerts a yielding force on the rods 19 which, after they are free of the tines 36, move individually sidewise until they meet a relatively unyielding surface such as the membrane wall of the section when the spring will yield and allow the rods to follow along the section wall with continued angular movement of the arms 7, the arms 18 hinging about the pins 17 and jackknifing with respect to the arms 7. It will be understood that should the rod 19 encounter a seed or other obstruction before it reaches the membrane wall, the above action will also take place, and the rod will follow the contour of the seed until it contacts the membrane wall.

When the rods come in contact with the membrane wall and are moved outwardly therealong by continued angular movement of the arms 7, the springs 30 gradually lose their tensioning force. However, the friction between the leading edge of the rod and the fruit continue to urge the rotating rods into engagement with the membrane wall, and the rods will follow along the plane of the bond between the juice sacs and wall and pry the sacs loose from the wall. During this outward movement of the rods 19 the stationary tines 36 engage the membrane wall in the apex of the section and restrain outward movement thereof and prevent the possibility of pulling a weak segment wall away from the core of the fruit.

When the rods have been moved through the periphery of the fruit as shown in Figure 1 and parted the bond along one of the section walls, the holding fork and fruit are again lowered and may be moved to a further sectionizing step. In the position shown in Figure 3 the arms 18 and rods hang free and, as soon as the fruit is lowered, movement of the lever 14 may be reversed to return the arms to their initial positions. During this movement, when they reach such positions that the springs 30 are again put under tension, the springs will straighten out the arms 18 to their positions where the lugs 23 engage the abutments 24 with the arms 18 aligned with the arms 7. To permit more freedom of relative movement of the free ends of the arms 18 at the center of the head, one side surface thereof may be cut away as indicated at 41. As the rods 19 approach the series of tines 36 and come in contact therewith, the joined connections between the arms 7 and 18 will yield sufficiently to allow the rods to again nest within the hollow tines upon final movement of the lever 14.

From the foregoing it will be seen that the invention provides for parting the bond between the juice sacs of a citrus fruit section and the membrane wall adjoined thereto by the relatively gentle prying action of a rotating rod of relatively small cross section which follows the plane of said bond and leaves the juice sacs substantially intact, and the series of tines 36, one for each rod restrain outward movement of the membrane structure from the core of the fruit. The operation may be performed on the fruit sections individually by means of a single rotating rod or simultaneously on a number of sections by a tool employing a multiplicity of the rotating rods. In either case, the bond between the juice sacs and both section walls may be parted by means of the rotating rod, or the bond may be parted along one wall only by means of the rotating rod and supplementary means employed to remove the section meat.

While the invention has been described as parting the bond between juice sacs and their adjoined section wall progressively outward from the core of the fruit, it will be obvious that the same means may be employed operating inwardly from the periphery toward the core and produce the same result in the same way. And, although the invention has been described with reference to citrus fruit, it will be recognized as applicable to separate bonds between other bodies where one is relatively yieldable or compressible and the other relatively tough.

In sectionizing or removing the membrane free sections from the fruit, the bond may be parted from between the juice sacs and one section wall only and the fruit then moved to another station of the machine for final separation of the section meats. This final separation may be accomplished by a device such as disclosed in our Patent No. 2,240,909 and which consists essentially of a series of rods parallel with the tines 39. This outer series of rods is rotated as a series relatively to the stationary series of holding tines 39 and wraps the membrane structure spirally thereabout and strips the relatively stiffer meats from the remaining bonded membrane walls.

As stated above, the number of fruit sections varies between nine and fifteen. We have found, however, that with a series of ten rods it is extremely seldom that in adjacent sections at least one of the adjacent bonds between the juice sacs and the membrane fails to be parted. For example, in a twelve-section fruit, ten sections will be operated on by the ten rotary rods and the bond parted between the meats and one wall of these ten sections. Two of the meat sections will remain bonded to both walls, but it will be found that the bond along the adjacent wall of the adjacent section will be parted. In practice this has been found sufficient to prepare the fruit for completion of the sectionizing operation by means of a relatively rotatable concentric series of stripping rods such as referred to above and disclosed in Patent 2,240,909 since it has been found that these stripping rods readily remove the few remaining sections which remain bonded to both of their membrane walls.

We claim:

1. In apparatus for severing radial section walls from the meat of citrus fruit sections, said apparatus including an elongated rotary rod of relatively small diameter and a movable support therefor journalling the rod adjacent one end thereof for rotation and for moving the rod from an initial position penetrating a fruit section closely within the apex of the radial walls of the section generally radially outwardly along a radial wall through the periphery of the section to break the bond between the wall and meat of the section, the improvement comprising an elongated non-rotary tine, a support therefor mounting the tine parallel with the rod and contiguous thereto in said initial position for penetration of the section together with the rod, said support for the tine restraining movement thereof from the penetrated position as the rod is moved outwardly, and the free end of said rod being extended beyond the corresponding end of the tine whereby the rod penetrate the fruit section in advance of the tine and opens a path through the section adjacent thereto to facilitate penetration by the tine.

2. Apparatus according to claim 1 in which the tine is positioned in the initial position of the rod radially of the section between the rod and the apex of the radial walls of the section.

3. Apparatus according to claim 1 in which the tine is of substantially semi-cylindrical channel shape opening toward the circumferential surface of the fruit section and nesting the rod in the initial position thereof.

4. In apparatus for severing radial section walls from the meat of citrus fruit sections, said apparatus including a circular series of parallel elongated rotary rods of relatively small diameter, movable support means for the rods rotationally journalling the same adjacent one end thereof in an initial position for penetration corewise through corresponding sections of the fruit and for then moving the rods generally radially outward from the initial position substantially along a radial wall of the sections through the circumferential periphery of the sections to break the bond between said walls and the meat of the sections, the improvement comprising a circular series of non-rotary tines corresponding in number with said rods, a support for the tines mounting the same in a fixed circle with one tine lying parallel and contiguous respectively to each rod in the initial position thereof for penetration of the sections together with the rods and to maintain the position of penetration of the tines as the rods are moved outwardly from said initial position, the free ends of the rods respectively extending longitudinally beyond the corresponding ends of the tines whereby the rods penetrate the sections in advance of the tines and open paths therethrough adjacent the same to facilitate penetration by the tines.

5. Apparatus according to claim 4 in which the tines are of semi-cylindrical channel shape opening radially outwardly of the series thereof and respectively nesting said rods in said initial position.

RALPH POLK, SR.
RALPH POLK, JR.

REFERENCES CITED

The following references are of record in the file of this patent:

UNITED STATES PATENTS

| Number | Name | Date |
|---|---|---|
| 2,121,097 | Polk et al. | June 21, 1938 |
| 2,199,345 | Polk, Sr., et al. | Apr. 30, 1940 |
| 2,246,896 | Polk, Sr., et al. | June 24, 1941 |
| 2,300,046 | Harwood | Oct. 27, 1942 |
| 2,489,195 | Polk, Sr., et al. | Nov. 22, 1949 |